United States Patent
Bystricky et al.

(10) Patent No.: US 7,308,565 B2
(45) Date of Patent: Dec. 11, 2007

(54) SAVING/RESTORING TASK STATE DATA FROM/TO DEVICE CONTROLLER HOST INTERFACE UPON COMMAND FROM HOST PROCESSOR TO HANDLE TASK INTERRUPTIONS

(75) Inventors: Juraj Bystricky, Richmond (CA); Doug McFadyen, Delta (CA); Keith Kejser, New Westminster (CA)

(73) Assignee: Seiko Epson Corporation, Tokyo (JP)

( * ) Notice: Subject to any disclaimer, the term of this patent is extended or adjusted under 35 U.S.C. 154(b) by 136 days.

(21) Appl. No.: 11/153,122

(22) Filed: Jun. 15, 2005

(65) Prior Publication Data

US 2006/0288299 A1    Dec. 21, 2006

(51) Int. Cl.
*G06F 9/48* (2006.01)

(52) U.S. Cl. .................................. 712/228; 718/108

(58) Field of Classification Search ..................... None
See application file for complete search history.

(56) References Cited

U.S. PATENT DOCUMENTS

| | | | | |
|---|---|---|---|---|
| 4,658,351 | A | 4/1987 | Teng | 718/103 |
| 5,179,702 | A | 1/1993 | Spix et al. | 718/102 |
| 5,438,663 | A * | 8/1995 | Matsumoto et al. | 345/520 |
| 5,727,211 | A | 3/1998 | Gulsen | 718/108 |
| 5,799,188 | A | 8/1998 | Manikundalam et al. | 718/108 |
| 6,061,711 | A | 5/2000 | Song et al. | 718/108 |
| 6,401,155 | B1 | 6/2002 | Saville et al. | 710/266 |
| 6,418,489 | B1 * | 7/2002 | Mason et al. | 710/22 |
| 6,651,163 | B1 | 11/2003 | Kranich et al. | 712/244 |
| 6,671,762 | B1 | 12/2003 | Soni et al. | 710/267 |
| 6,694,347 | B2 | 2/2004 | Joy et al. | 718/108 |
| 6,823,517 | B1 | 11/2004 | Kalman | 718/108 |
| 6,826,681 | B2 | 11/2004 | Kissell et al. | 712/228 |
| 2003/0001848 | A1 * | 1/2003 | Doyle et al. | 345/501 |
| 2003/0119562 | A1 * | 6/2003 | Kokubo | 455/566 |
| 2003/0120712 | A1 * | 6/2003 | Reid | 709/107 |

* cited by examiner

*Primary Examiner*—Kenneth S. Kim
(74) *Attorney, Agent, or Firm*—Mark P. Watson

(57) ABSTRACT

A system and method for performing an interface save/restore procedure in an electronic device includes a processor that begins to execute a first task in conjunction with a host interface of a display processor. The processor subsequently receives an interrupt request for executing a second task that has a higher priority than the first task. A save/restore module responsively stores task states from the host interface into an interface states register. The task states correspond to an interrupted execution point in the first task. The processor temporarily stops the first task to execute the second task. The save/restore module restores the stored task states to the host interface after the second task is completed, and the processor may then efficiently resume the first task.

22 Claims, 8 Drawing Sheets

SAVING/RESTORING TASK STATE DATA FROM/TO DEVICE CONTROLLER HOST INTERFACE UPON COMMAND FROM HOST PROCESSOR TO HANDLE TASK INTERRUPTIONS

BACKGROUND SECTION

1. Field of Invention

This invention relates generally to electronic display controller systems, and relates more particularly to a system and method for performing an interface save/restore procedure in an electronic device.

2. Description of the Background Art

Implementing efficient methods for handling electronic data is a significant consideration for designers and manufacturers of contemporary electronic devices. However, efficiently handling data with electronic devices may create substantial challenges for system designers. For example, enhanced demands for increased device functionality and performance may require more system operating power and require additional hardware resources. An increase in power or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that efficiently manipulates, transfers, and displays digital image data may benefit from an efficient implementation because of the large amount and complexity of the digital data involved.

Due to growing demands on system resources and substantially increasing data magnitudes, it is apparent that developing new techniques for controlling the handling of electronic data is a matter of concern for related electronic technologies. Therefore, for all the foregoing reasons, developing efficient systems for handling electronic data remains a significant consideration for designers, manufacturers, and users of contemporary electronic devices.

SUMMARY

In accordance with the present invention, a system and method are disclosed for performing an interface save/restore procedure in an electronic device. In certain embodiments, the electronic device may be implemented to include a central-processing unit (CPU), a display, and a display controller with a deformation module.

In one embodiment, the CPU begins executing a task 1 in conjunction with the display controller. For example, the CPU may communicate with the display controller via a host interface to perform task 1. Subsequently, the CPU receives a task 2 interrupt from any appropriate interrupt source to perform a higher-priority task 2 in conjunction with the display controller. In response to the task 2 interrupt, the CPU issues a Save_Interface_States command to the display controller. A save/restore module of the display controller saves current task 1 states into an interface states register in response to the Save_Interface_States command received from the CPU.

The CPU then executes the higher-priority task 2 in conjunction with the display controller. When task 2 has been successfully completed, the CPU issues a Restore_Interface_States command to the display controller. The save/restore module of the display controller then restores the saved task 1 states from the interface states register to the host interface (or other appropriate entity) in response to the Restore_Interface_States command received from the CPU. Finally, the CPU may resume executing the interrupted task 1 with all corresponding states, values, and conditions being the same as when task 1 was originally interrupted in favor of higher-priority task 2.

The foregoing save/restore procedure may be extended to support any desired number of interrupted tasks by utilizing multi-tiered save/restore procedures. For at least the foregoing reasons, the present invention provides an improved system and method for performing an interface save/restore procedure in an electronic device.

DETAILED DESCRIPTION

The present invention relates to an improvement in display controller systems. The following description is presented to enable one of ordinary skill in the art to make and use the invention, and is provided in the context of a patent application and its requirements. Various modifications to the embodiments disclosed herein will be apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for performing an interface save/restore procedure in an electronic device, and includes a processor that begins to execute a first task in conjunction with a host interface of a display processor. The processor subsequently receives an interrupt request for executing a second task that has a higher priority than the first task. A save/restore module responsively stores task states from the host interface into an interface states register. The task states correspond to an interrupted execution point in the first task. The processor temporarily stops the first task to execute the second task. The save/restore module restores the stored task states to the host interface after the second task is completed, and the processor may then efficiently resume the first task.

Figure 1:
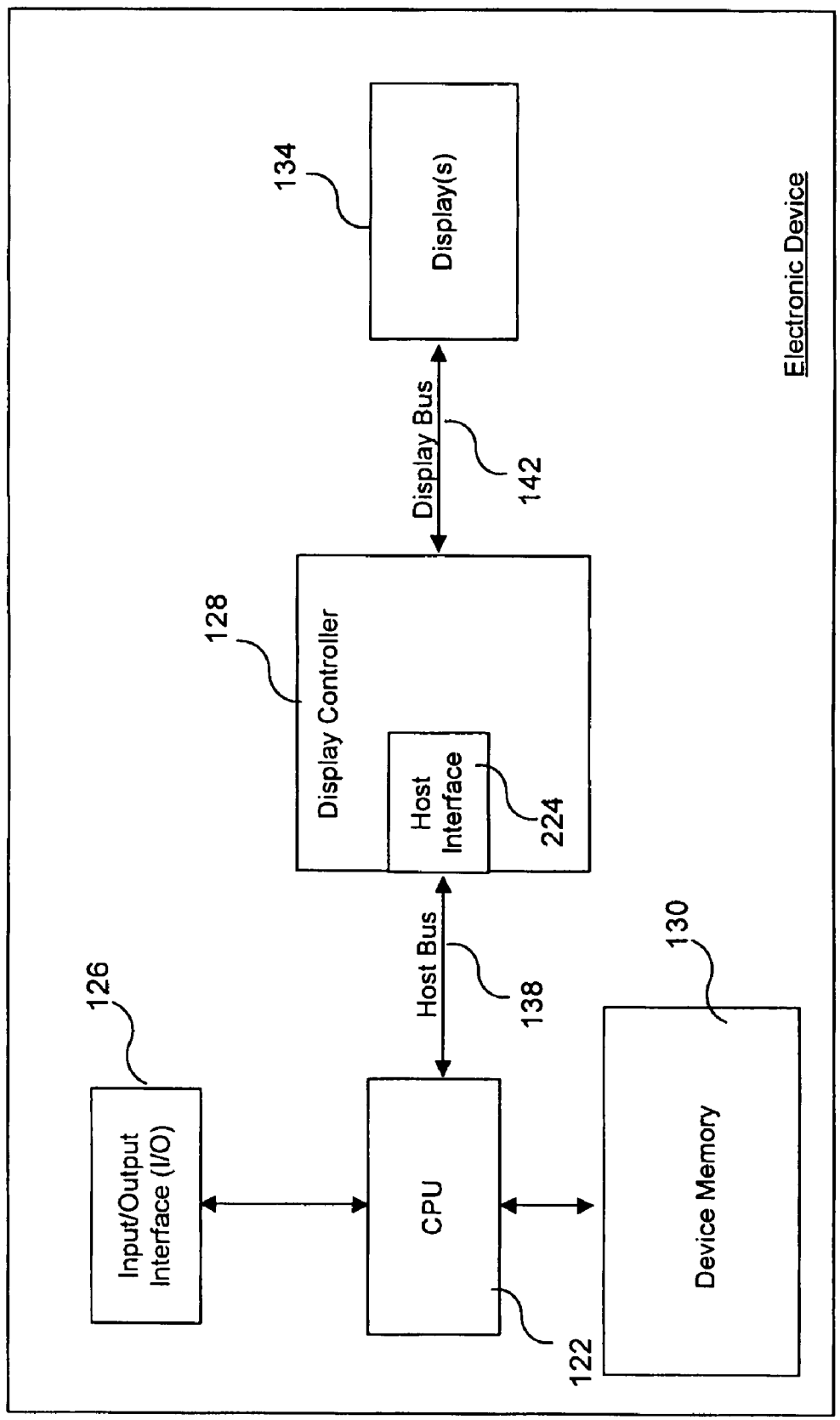
FIG. 1 is a block diagram for one embodiment of an electronic device, in accordance with the present invention.

Referring now to FIG. 1, a block diagram for one embodiment of an electronic device 110 is shown, according to the present invention. The FIG. 1 embodiment includes, but is not limited to, a central processing unit (CPU) 122, an input/output interface (I/O) 126, a display controller 128, a device memory 130, and one or more display(s) 134. In alternate embodiments, electronic device 110 may include elements or functionalities in addition to, or instead of, certain of the elements or functionalities discussed in conjunction with the FIG. 1 embodiment.

In the FIG. 1 embodiment, CPU 122 may be implemented as any appropriate and effective processor device or microprocessor to thereby control and coordinate the operation of electronic device 110 in response to various software program instructions. In the FIG. 1 embodiment, device memory 130 may comprise any desired storage-device configurations, including, but not limited to, random access memory (RAM), read-only memory (ROM), and storage devices such as removable memory or hard disk drives. In the FIG. 1 embodiment, device memory 130 may include, but is not limited to, deformation software 146 with program instructions that are executed by CPU 122 to support various deformation procedures for electronic device 110.

In the FIG. 1 embodiment, the a device application (not shown) may include program instructions for allowing CPU 122 to provide image data and corresponding transfer and display information via host bus 138 to display controller 128. In accordance with the present invention, display controller 128 then responsively provides the received image data via display bus 142 to at least one of the display(s) 134 of electronic device 110. In the FIG. 1 embodiment, input/output interface (I/O) 126 may include one or more interfaces to receive and/or transmit any required types of information to or from electronic device 110. Input/output interface 126 may include one or more means for allowing a device user to communicate with electronic device 110. In addition, various external electronic devices may communicate with electronic device 110 through I/O 126. For example, a digital imaging device, such as a digital camera, may utilize input/output interface 126 to provide captured image data to electronic device 110.

In the FIG. 1 embodiment, electronic device 110 may advantageously utilize display controller 128 for efficiently managing various operations and functionalities relating to display(s) 134. The implementation and functionality of display controller 128 is further discussed below in conjunction with FIGS. 2-4 and 6-8. In the FIG. 1 embodiment, electronic device 110 may be implemented as any desired type of electronic device or system. For example, in certain embodiments, electronic device 110 may alternately be implemented as a cellular telephone, a personal digital assistant device, an electronic imaging device, or a computer device. Various embodiments for the operation and utilization of electronic device 110 are further discussed below in conjunction with FIGS. 2-8.

Figure 2:
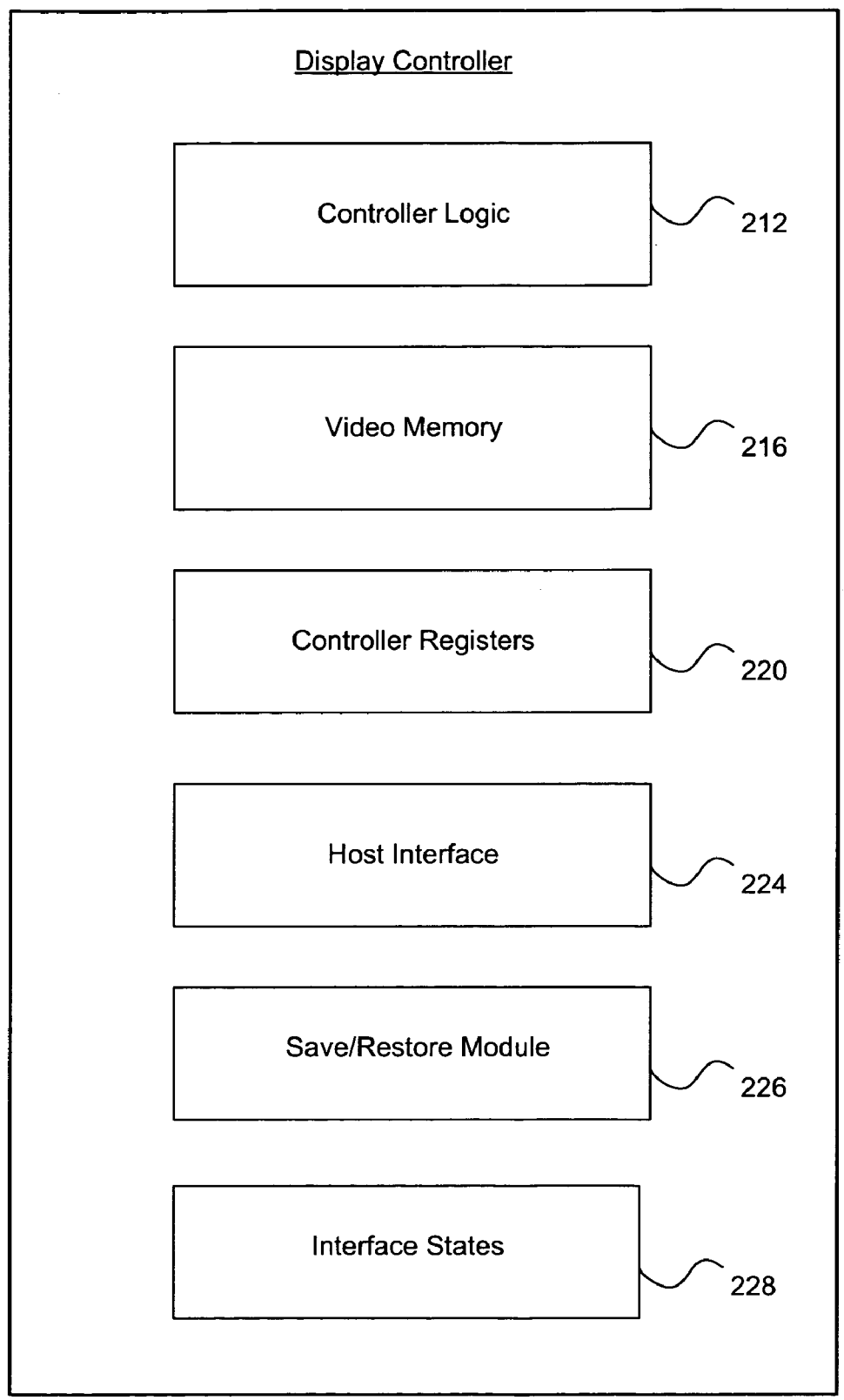
FIG. 2 is a block diagram for one embodiment of the display controller of FIG. 1, in accordance with the present invention.

Referring now to FIG. 2, a block diagram for one embodiment of the FIG. 1 display controller 128 is shown, in accordance with the present invention. The FIG. 2 embodiment includes, but is not limited to, controller logic 212, video memory 216, controller registers 220, a host interface 224, a save/restore module 226, and one or more saved interface states 228. In alternate embodiments, display controller 128 may include elements or functionalities in addition to, or instead of, certain of the elements or functionalities discussed in conjunction with the FIG. 2 embodiment.

In the FIG. 2 embodiment, display controller 128 may be implemented as an integrated circuit device that accepts image data and corresponding transfer and display information from CPU 122 (FIG. 1). Display controller 128 then automatically provides the received image data to display 134 of electronic device 110 in an appropriate and efficient manner for displaying to a device user. In the FIG. 2 embodiment, controller logic 212 manages and coordinates the overall operation of display controller 128. In the FIG. 2 embodiment, display controller 128 may utilize controller registers 220 to store various types of configuration, control and status information.

In the FIG. 2 embodiment, display controller 128 utilizes host interface 224 to perform bi-directional communications with CPU 122 via a host bus 138 (FIG. 1). In certain embodiments, in order to implement host interface 224 and host bus 138 in an efficient, space-saving, and economical manner, host interface 224 typically receives/transmits information corresponding to only a single processing task at any given time. For example, CPU 122 may perform a data write task to transfer data to display controller 128. Similarly, CPU 122 may perform a data read task to access data from display controller 128.

In accordance with the present invention, display controller 128 may advantageously utilize save/restore module 226 to save interface states 228 from host interface 224 (or other appropriate source) whenever a given lower-priority task must be interrupted in order to service another higher-priority task. After the higher-priority task has been executed, display controller may then restore the saved interface states 228 to host interface 224 (or other appropriate source) in order to efficiently and effectively complete the interrupted lower-priority task. The utilization of display controller is further discussed below in conjunction with FIGS. 3-8.

Figure 3:
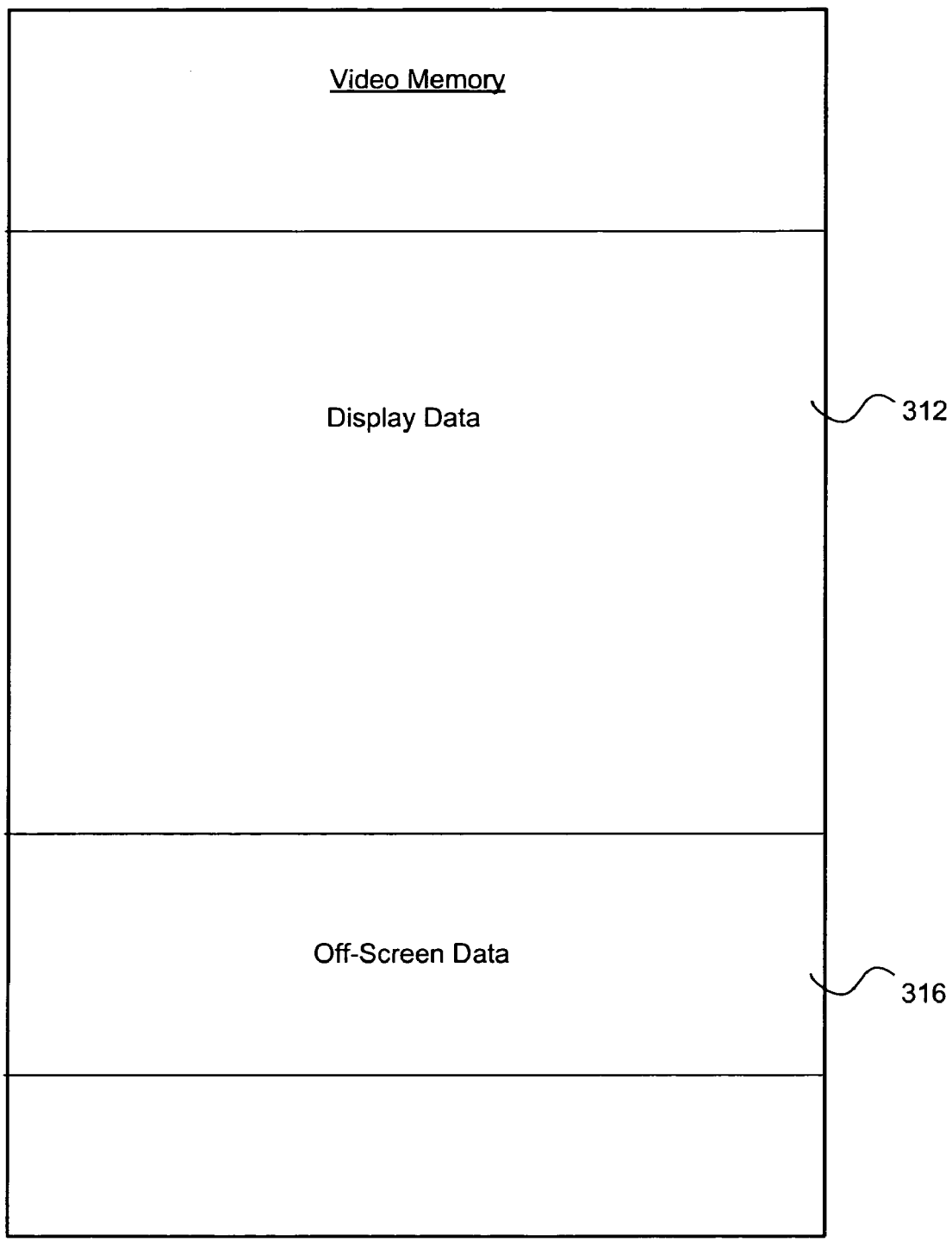
FIG. 3 is a block diagram for one embodiment of the video memory of FIG. 2, in accordance with the present invention.

Referring now to FIG. 3, a block diagram for one embodiment of the FIG. 2 video memory 216 is shown, in accordance with the present invention. In the FIG. 3 embodiment, video memory 216 includes, but is not limited to, display data 312 and off-screen data 316. In alternate embodiments, video memory 216 may include elements and functionalities in addition to, or instead of, certain of the elements and functionalities discussed in conjunction with the FIG. 3 embodiment.

In the FIG. 3 embodiment, video memory 216 may be implemented by utilizing any effective types of memory devices or configurations. For example, in certain embodiments, video memory 216 may be implemented as a random-access memory (RAM) device. In the FIG. 3 embodiment, display data 312 may include image data that is provided by CPU 122 or other appropriate source. In the FIG. 3 embodiment, off-screen data 316 may include any appropriate type of information or data that is not intended for presentation upon display 134 of electronic device 110. For example, off-screen data 316 may be utilized to cache certain fonts or other objects for use by display controller 128.

Figure 4:
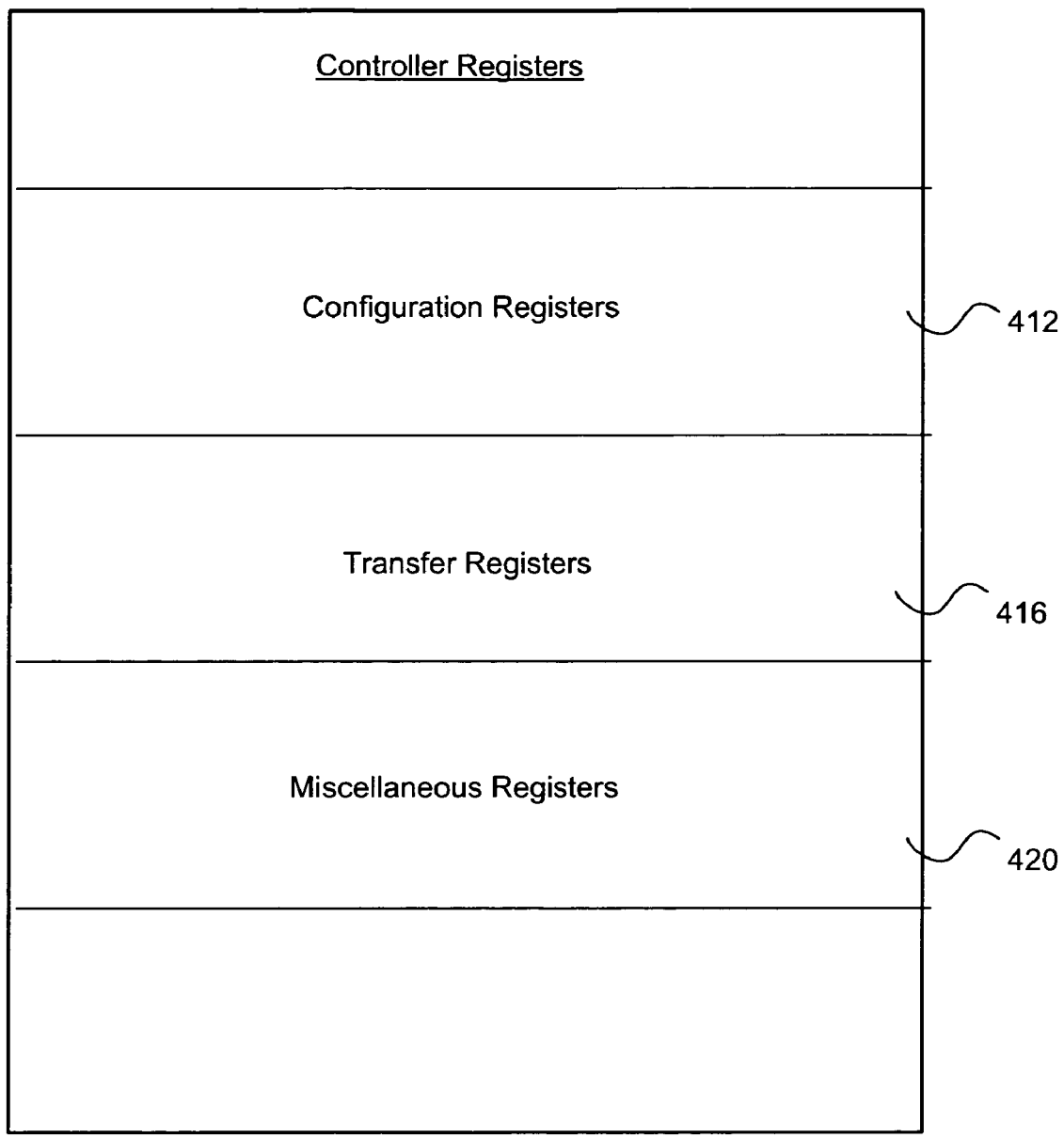
FIG. 4 is a block diagram for one embodiment of the controller registers of FIG. 2, in accordance with the present invention.

Referring now to FIG. 4, a block diagram for one embodiment of the FIG. 2 controller registers 220 is shown, in accordance with the present invention. In the FIG. 4 embodiment, controller registers 220 include, but are not limited to, configuration registers 412, transfer registers 416, and miscellaneous registers 420. In alternate embodiments, controller registers 220 may include elements and functionalities in addition to, or instead of, certain of the elements and functionalities discussed in conjunction with the FIG. 4 embodiment.

In the FIG. 4 embodiment, CPU 122 (FIG. 1) or other appropriate entities may write information into controller registers 220 to specify various types of operational parameters and other relevant information for use by configuration logic 212 of display controller 128. In the FIG. 4 embodiment, controller registers 220 may utilize configuration registers 412 for storing various types of information relating to the configuration of display controller 128 and/or display 134 of electronic device 110. For example, configuration registers 220 may specify a display type, a display size, a display frame rate, and various display timing parameters. In the FIG. 4 embodiment, controller registers 220 may utilize transfer registers 416 for storing various types of information relating to transfer operations for providing pixel data from video memory 216 (FIG. 3) to display 134 of electronic device 110. In the FIG. 4 embodiment, controller registers 220 may utilize miscellaneous registers 420 for effectively storing any desired type of information or data for use by display controller 128.

Figure 5:
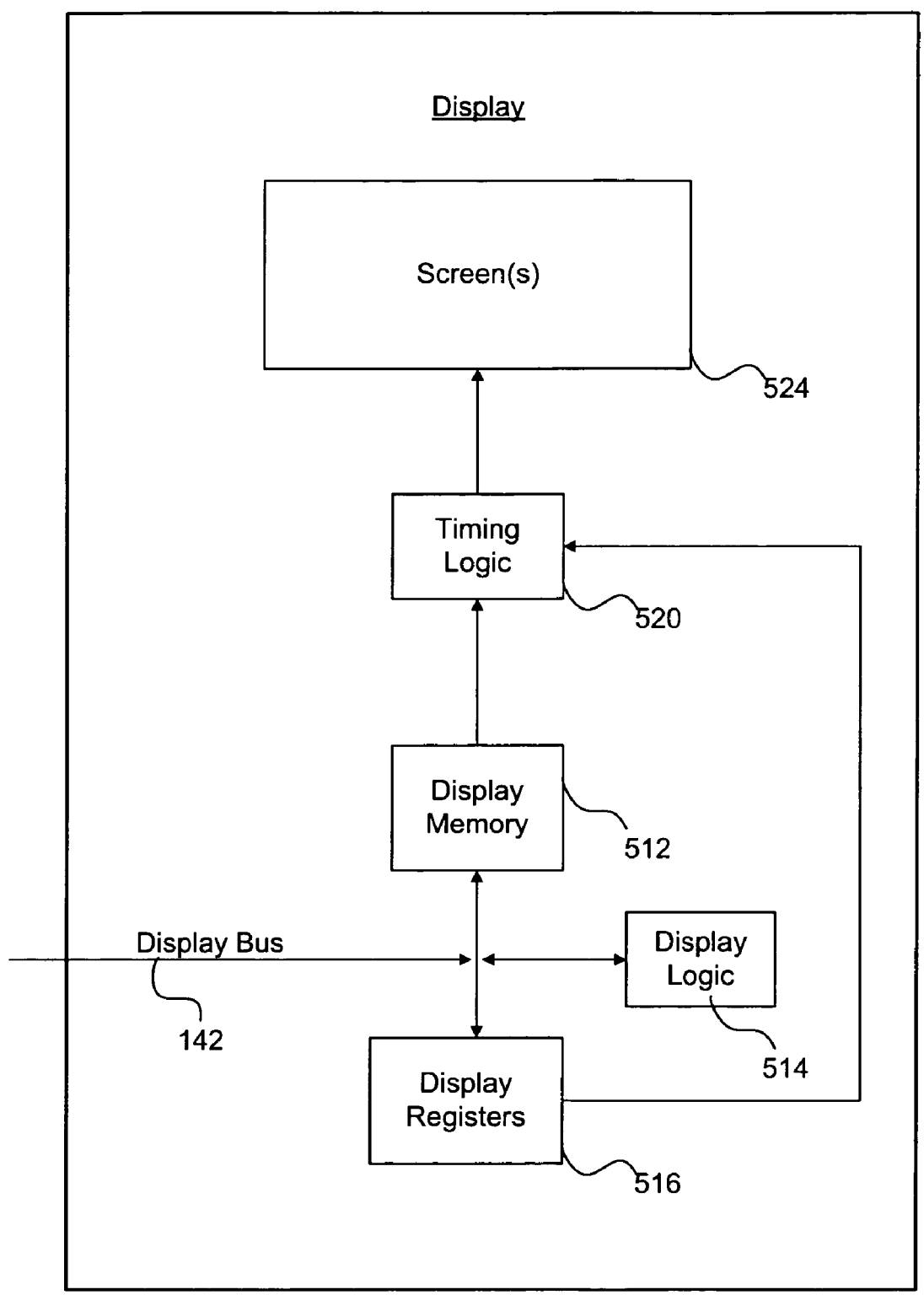
FIG. 5 is a block diagram for one embodiment of the display of FIG. 1, in accordance with the present invention.

Referring now to FIG. 5, a block diagram for one embodiment of the FIG. 1 display 134 is shown, in accordance with the present invention. In the FIG. 5 embodiment, display 134 includes, but is not limited to, a display memory 512, display logic 514, display registers 516, timing logic 520, and one or more screen(s) 524. In alternate embodiments, display 134 may include elements and functionalities in addition to, or instead of, certain of the elements and functionalities discussed in conjunction with the FIG. 5 embodiment.

In the FIG. 5 embodiment, display 134 is implemented as a random-access-memory based liquid-crystal display panel (RAM-based LCD panel). However, in alternate embodiments, display 134 may be implemented by utilizing any type of appropriate display technologies or configurations. In the FIG. 5 embodiment, display controller 128 provides various types of display information to display registers 516 via display bus 142. Display registers 516 may then utilize the received display information for effectively controlling timing logic 520. In the FIG. 5 embodiment, display logic 514 manages and coordinates data transfer and display functions for display 134.

In the FIG. 5 embodiment, display controller 128 provides image data from video memory 216 (FIG. 2) to display memory 512 via display bus 142. In the FIG. 5 embodiment, display memory 512 is typically implemented as random-access memory (RAM). However, in various other embodiments, any effective types or configurations of memory devices may be utilized to implement display memory 512. In the FIG. 5 embodiment, display memory 512 then advantageously provides the image data received from display controller 128 to one or more screens 524 via timing logic 520 for viewing by a device user of electronic device 110.

Figure 6:
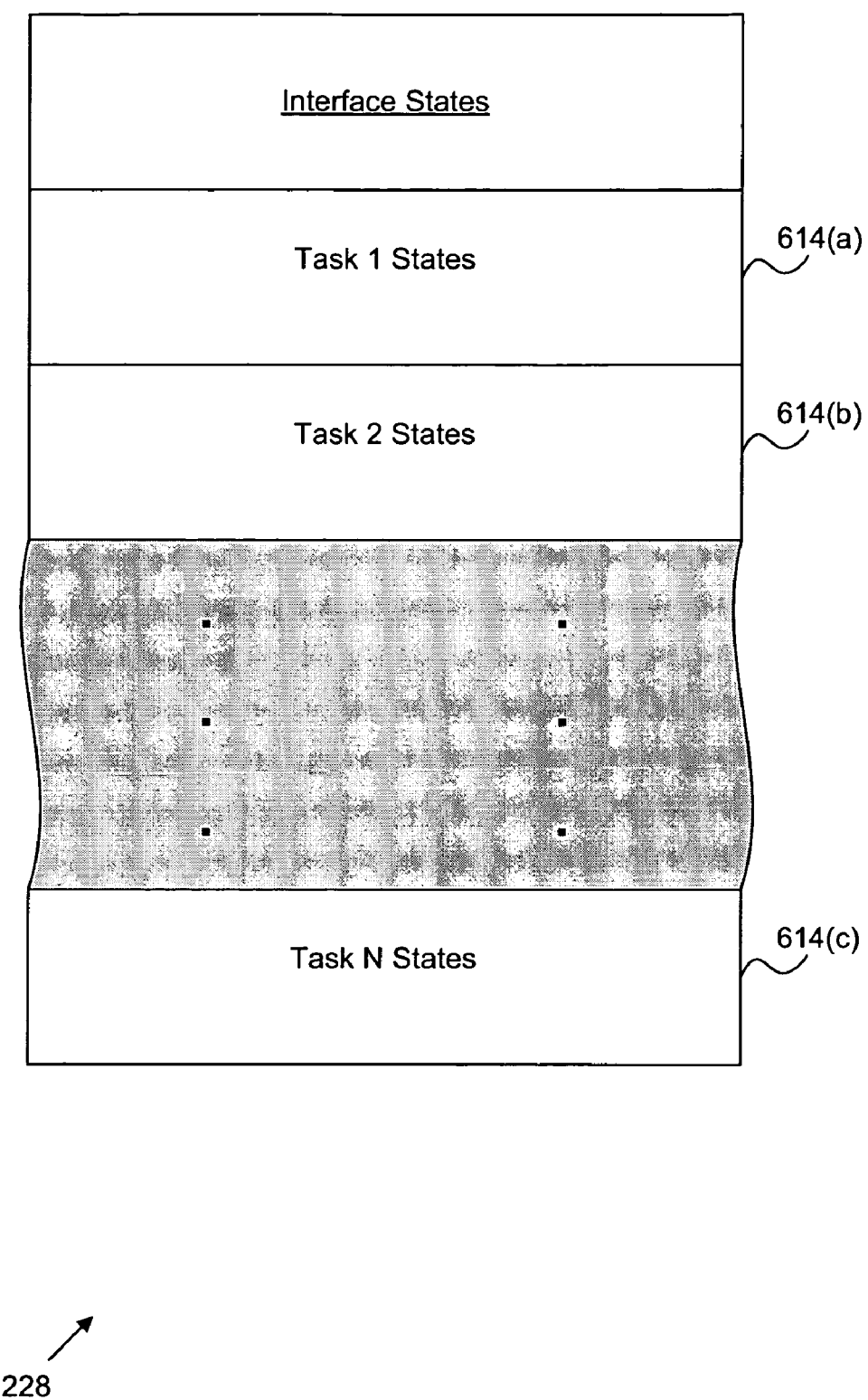
FIG. 6 is a block diagram for one embodiment of the interface states of FIG. 2, in accordance with the present invention.

Referring now to FIG. 6, a block diagram for one embodiment of the FIG. 2 interface states 228 is shown, in accordance with one embodiment of the present invention. In alternate embodiments, interface states 228 may readily be implemented using components and configurations in addition to, or instead of, certain those components and configurations discussed in conjunction with the FIG. 6 embodiment. For example, interface states 228 may include a register storing separate set of interface states for any desired number of interrupted processing tasks, depending upon memory size and the particular implementation of display controller 128.

In the FIG. 6 embodiment, interface states 228 may include task 1 states 614(a) through task N states 614(c) that each correspond to a different respective processing task that is currently interrupted in favor of a higher-priority processing task. Interface states 228 may include any desired type of information from host interface 224 or any other appropriate entity. For example, interface states 228 may include register values, addresses, pre-fetched information, counter values, and internal values. In certain embodiments, host interface 224 may be implemented as a state machine, and interface states 228 may include current state values from the state machine. The utilization of interface states 228 is further discussed below in conjunction with FIGS. 7 and 8.

Figure 7:
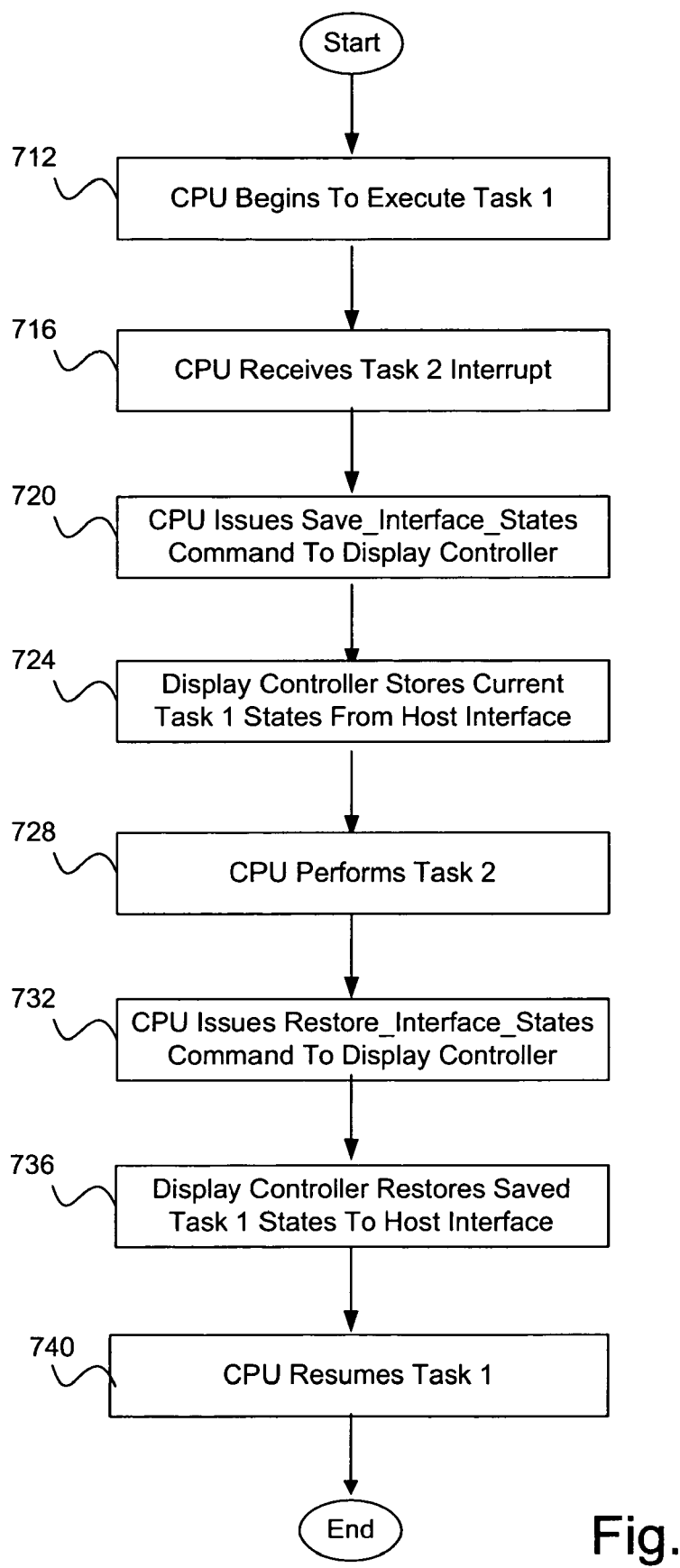
FIG. 7 is a flowchart of method steps for performing an interface save/restore procedure, in accordance with one embodiment the present invention.

Referring now to FIG. 7, a flowchart of method steps for performing an interface save/restore procedure is shown, in accordance with one embodiment of the present invention. The FIG. 7 example is presented for purposes of illustration, and in alternate embodiments, the present invention may readily utilize steps and sequences other than certain of those steps and sequences discussed in conjunction with the FIG. 7 embodiment.

In the FIG. 7 embodiment, in step 712, CPU 122 (FIG. 1) begins executing a task 1 in conjunction with display controller 128 (FIG. 1). For example, CPU 122 may communicate with display controller 128 via a host interface 224 (FIG. 2) to perform task 1. In step 716, CPU 122 receives a task 2 interrupt from any appropriate interrupt source to perform a higher-priority task 2 in conjunction with display controller 128.

In response to the task 2 interrupt, in step 720, CPU 122 issues a Save_Interface_States command to display controller 128. In step 724, a save/restore module 226 (FIG. 2) of display controller 128 saves all current task 1 states 614(a) into interface states register 228 (FIG. 6) in response to the Save_Interface_States command received from CPU 122.

In step 728, CPU 122 performs higher-priority task 2 in conjunction with display controller 128. In step 732, when task 2 has been successfully completed, CPU 122 issues a Restore_Interface_States command to display controller 128. In step 736, the save/restore module 226 of display controller 128 restores the saved task 1 states 614(a) from interface states register 228 to the host interface 224 (or other appropriate entity) in response to the Restore_Interface_States command received from CPU 122. Finally, in step 740, CPU 122 may resume executing the interrupted task 1 with all corresponding states, values, and conditions being the same as when task 1 was originally interrupted.

The FIG. 7 embodiment discusses performing a save/restore procedure for a display controller 128, however in alternate embodiments, the save/restore procedure may be effectively utilized in conjunction with any other type of appropriate device. In addition, the FIG. 7 embodiment is presented in the context of a single higher-priority task. However, the present invention may be extended to support any desired number of interrupted tasks utilizing multi-tiered save/restore procedures. One exemplary embodiment illustrating multi-tiered save/restore procedures is discussed below in conjunction with FIG. 8.

Figure 8:
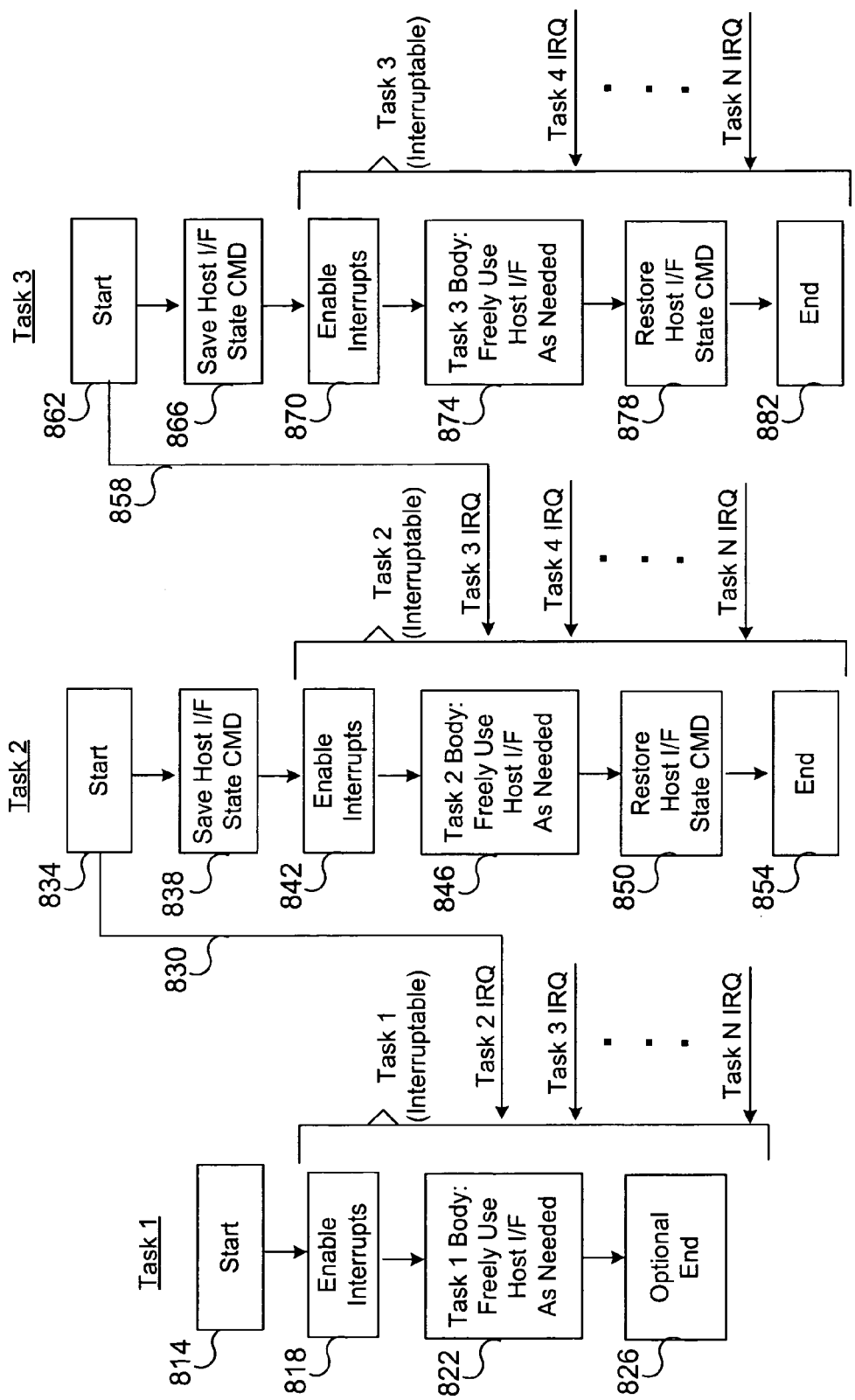
FIG. 8 is a diagram illustrating a multi-tiered interface save/restore procedure, in accordance with one embodiment of the present invention.

Referring now to FIG. 8, a diagram illustrating a multi-tiered interface save/restore procedure is shown, in accordance with one embodiment of the present invention. The FIG. 8 example is presented for purposes of illustration, and in alternate embodiments, the present invention may readily utilize techniques and sequences other than certain of those techniques and sequences discussed in conjunction with the FIG. 8 embodiment.

In the FIG. 8 embodiment, in step 814, CPU 122 and display controller 128 start task 1, and in step 818, task 1 interrupts are enabled for any task with the same or higher priority than task 1. In step 822, during the task 1 body, CPU 122 freely uses the host interface 224 of display controller 128 as needed to perform task 1. Task 1 is interruptable by a task 2 interrupt (IRQ) through a task N interrupt (IRQ).

In the FIG. 8 embodiment, while task 1 is executing, CPU 122 receives a task 2 interrupt (IRQ) 830 from a task 2 that has a higher priority level than currently-executing task 1. CPU 122 and display controller 128 responsively start task 2. In step 838, CPU 122 issues a Save_Interface_States command to display controller 128, which responsively stores task 1 states 614(a) (FIG. 6) corresponding to interrupted task 1 into interface states 228. In step 842, task 2 interrupts are enabled for any task with the same or higher priority than task 2. In step 846, during the task 2 body, CPU 122 freely uses the host interface 224 of display controller 128 as needed to perform task 2. Task 2 is interruptable by a task 3 interrupt (IRQ) through a task N interrupt (IRQ).

In the FIG. 8 embodiment, while task 2 is executing, CPU 122 receives a task 3 interrupt (IRQ) 858 from a task 3 that has a higher priority level than currently-executing task 2. CPU 122 and display controller 128 responsively start task 3. In step 866, CPU 122 issues a Save_Interface_States command to display controller 128, which responsively stores task 2 states 614(b) (FIG. 6) corresponding to interrupted task 2 into interface states 228. In step 870, task 3 interrupts are enabled for any task with the same or higher priority than task 3. In step 874, during the task 3 body, CPU 122 freely uses the host interface 224 of display controller 128 as needed to perform task 3. Task 3 is interruptable by a task 4 interrupt (IRQ) through a task N interrupt (IRQ).

In step 878, after task 3 has been successfully completed, CPU 122 issues a Restore_Interface_States command to display controller 128, and display controller responsively restores the task 2 states 614(b) from interface states 228 to host interface 224. In the FIG. 8 embodiment, when display controller 128 receives a given Restore_Interface_States command, display controller 128 restores the most recently-stored set of task states 614 from interface states 228 to host interface 224.

In the FIG. 8 embodiment, after display controller 128 restores task 2 states 614(b) to host interface 224, CPU 122 and display controller 128 may then resume executing the interrupted task 2 body in step 846. In step 850, after task 2 has been successfully completed, CPU 122 issues a Restore_Interface_States command to display controller 128, and display controller responsively restores the task 1 states 614(a) from interface states 228 to host interface 224.

In the FIG. 8 embodiment, after display controller 128 restores task 1 states 614(a) to host interface 224, CPU 122 and display controller 128 may then resume executing the interrupted task 1 body in step 822. For at least the foregoing reasons, the present invention provides an improved system and method for performing an interface save/restore procedure in an electronic device.

The invention has been explained above with reference to certain preferred embodiments. Other embodiments will be apparent to those skilled in the art in light of this disclosure. For example, the present invention may be implemented using certain configurations and techniques other than those described in the embodiments above. Additionally, the present invention may effectively be used in conjunction with systems other than those described above as the preferred embodiments. Therefore, these and other variations upon the foregoing embodiments are intended to be covered by the present invention, which is limited only by the appended claims.

What is claimed is:

1. A system for performing a save/restore procedure in an electronic device, comprising:
   a save/restore module that stores first task states into an interface states register when a first task is temporarily interrupted to execute a second task, said first task states being generated from a host interface of a controller device that performs said first task and said second task, said host interface supporting bi-directional communications between said controller device and a processor that controls said electronic device, said first task states corresponding to an interrupted execution point in said first task, said save/restore module restoring said first task states to said host interface after said second task is completed, said controller device then resuming said first task.

2. The system of claim 1 wherein said controller device is implemented as a display controller integrated-circuit device that includes said host interface, said save/restore module, and said interface states register.

3. The system of claim 1 wherein said processor initially begins to execute said first task with said host interface of said controller device, said processor subsequently receiving an interrupt request for executing said second task with a higher priority than said first task.

4. The system of claim 3 wherein said display controller functions as a interface between said processor and a display device in a portable electronic device.

5. The system of claim 3 wherein said save/restore module of said display controller performs said save/restore procedure in a manner that is transparent to said processor.

6. The system of claim 3 wherein said processor issues a save command to said controller device to instruct said save/restore module to store said first task states.

7. The system of claim 3 wherein said processor issues a restore command to said controller device to instruct said save/restore module to restore said first task states after said second task is completed.

8. The system of claim 1 wherein said host interface is implemented to support only one processing task at any given time.

9. The system of claim 1 wherein said first task states include addresses, register values, pre-fetched words, and internal values.

10. The system of claim 1 wherein said host interface is implemented as a state machine, said first task states including state values from said state machine.

11. The system of claim 3 wherein said interrupt request is generated from an interrupt source coupled to said electronic device to request immediate execution of said second task by said processor in conjunction with said controller device.

12. The system of claim 3 wherein said first task and said second task include transferring information between said processor and said controller device to support displaying image data on a display of said electronic device.

13. The system of claim 3 wherein said processor resumes said first task with said host interface having an operating status that is identical to when said first task was interrupted to execute said second task.

14. The system of claim 3 wherein said save/restore module supports a multi-tiered hierarchy of interrupted processing tasks with corresponding saved task states in addition to said first task and said second task.

15. The system of claim 14 wherein a restore command from said processor causes said save/restore module to restore a most-recently saved set of task states to said host interface.

16. The system of claim 3 wherein said processor receives a second interrupt request for executing a third task that has a higher priority than said second task, said save/restore module responsively storing second task states from said host interface into said interface states register, said second task states corresponding to an interrupted execution point in said second task.

17. The system of claim 16 wherein said processor temporarily stops said second task to execute said third task, said save/restore module restoring said second task states to said host interface after said third task is completed, said processor then resuming said second task.

18. The system of claim 3 wherein said first task and said second task are separate threads being executed by said processor in a multi-threading environment.

19. The system of claim 4 wherein said display device is implemented as a liquid-crystal display device.

20. The system of claim 4 wherein said portable electronic device is implemented as a cellar telephone device.

21. A method for performing a save/restore procedure in an electronic device, comprising the steps of:
   utilizing a save/restore module to store first task states into an interface states register when a first task is temporarily interrupted to execute a second task, said first task states being generated from a host interface of a controller device that performs said first task and said second task, said host interface supporting bi-directional communications between said controller device and a processor that controls said electronic device, said first task states corresponding to an interrupted execution point in said first task;
   restoring said first task states to said host interface with said save/restore module after said second task is completed; and
   resuming said first task with said controller device.

22. A system for performing a save/restore procedure in an electronic device, comprising:
   a save/restore module that stores task state generated form a host interface of a controller device when a first task is interrupted to execute a second task, said save/restore module restoring said task states to said controller device after said second task is completed, said controller device then resuming said first task, said host interface supporting bi-directional communications between said controller device and a processor that controls said electronic device.

* * * * *